(12) United States Patent
Arai et al.

(10) Patent No.: US 9,254,595 B2
(45) Date of Patent: Feb. 9, 2016

(54) DECORATIVE SHEET AND IN-MOLD FORMING METHOD

(75) Inventors: Yoshimitsu Arai, Ashigarakami-gun (JP); Atsushi Sakamoto, Ashigarakami-gun (JP); Kenjirou Araki, Ashigarakami-gun (JP); Kyohei Mochizuki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 549 days.

(21) Appl. No.: 13/587,533

(22) Filed: Aug. 16, 2012

(65) Prior Publication Data

US 2013/0049267 A1  Feb. 28, 2013

(30) Foreign Application Priority Data

Aug. 24, 2011  (JP) ................. 2011-182364

(51) Int. Cl.
*B29C 45/14* (2006.01)
*B32B 3/10* (2006.01)
*B29K 105/16* (2006.01)
*B29L 9/00* (2006.01)
*B29L 31/00* (2006.01)

(52) U.S. Cl.
CPC ..... *B29C 45/14811* (2013.01); *B29C 45/14688* (2013.01); *B32B 3/10* (2013.01); *B29C 2045/14704* (2013.01); *B29C 2045/14713* (2013.01); *B29K 2105/16* (2013.01); *B29K 2995/002* (2013.01); *B29L 2009/00* (2013.01); *B29L 2031/722* (2013.01); *Y10T 428/24802* (2015.01); *Y10T 428/24851* (2015.01); *Y10T 428/24893* (2015.01)

(58) Field of Classification Search
CPC ............... Y10T 428/24802; Y10T 428/24851; Y10T 428/24868; Y10T 428/24893
USPC ............................... 428/195.1, 201, 204, 207
See application file for complete search history.

(56) References Cited

U.S. PATENT DOCUMENTS 7,992,989 B2 * 8/2011 Makuta et al. ................ 347/100

FOREIGN PATENT DOCUMENTS

| JP | 2005262452 A | 9/2005 |
|----|--------------|--------|
| JP | 2008087248 A | 4/2008 |
| JP | 2009-067860 A | 4/2009 |
| JP | 2009262521 A | 11/2009 |

OTHER PUBLICATIONS

Machine translation of JP2005-262452 acquired Feb. 5, 2015.*

(Continued)

*Primary Examiner* — Gerard Higgins
(74) *Attorney, Agent, or Firm* — Sughrue Mion, PLLC (57) ABSTRACT

Provided are a decorative sheet having stretchability and heat resistance and an in-mold forming method capable of forming in-mold injection formed products having excellent decorative image. A decorative sheet includes an image layer and an image running prevention region in order on a resin sheet, in which the image layer is a cured image of an ink composition containing (a) a polymerizable compound, (b) a polymerization initiator, and (c) a coloring agent; the image running prevention region is a cured layer of a composition for running prevention containing (a) a polymerizable compound, and (b) a polymerization initiator; and the image running prevention region has superior heat resistance to the image layer, and an injection forming method using the decorative sheet.

14 Claims, 2 Drawing Sheets

(56) References Cited

OTHER PUBLICATIONS

Machine translation of JP 2008-087248 acquired Feb. 5, 2015.*
Sartomer Urethane Acrylates product range acquired from http://emea.sartomer.com/en/products/acrylates/urethane-acrylates/index.html on Jul. 10, 2015.*
Swiderski et al., "Synthesis and Properties of Urethane Acrylate Oligomers: Direct versus Reverse Addition" Ind. Eng. Chem. Res., 2004, 43, p. 6281-6284.*
Notice of Reasons for Rejection, dated Jul. 2, 2013, issued in corresponding JP Application No. 2011-182364, 16 pages in English and Japanese.
Communication, dated Aug. 13, 2014, issued in EP Application No. 12177807.0, 5 pages.
Final Rejection, dated Apr. 30, 2014, issued in corresponding JP Application No. 2011-182364, 5 pages in English and Japanese.

* cited by examiner

DECORATIVE SHEET AND IN-MOLD FORMING METHOD

BACKGROUND OF THE INVENTION

1. Field of the Invention

The present invention relates to a decorative sheet and an in-mold forming method.

2. Description of the Related Art

In-mold forming is applied in a large number of fields, and is widely adopted as a method of three-dimensional decorative forming in the fields of consumer electronics, communications, general goods, and the like. In in-mold forming, a decorative sheet is fixed to an inner wall of a hollow portion of an injection forming machine, and integrated forming is performed with an image layer on the decorative sheet by injecting and forming resin. Hitherto, printing, painting, and the like have often been used in the manufacturing of such decorative sheets. However, in a case where there is a small number of copies, or a short delivery time, manufacturing the decorative sheet using the ink jet recording method is easy. The decorative sheet and formed products using the ink jet recording method are disclosed in JP2009-67860A, for example.

SUMMARY OF THE INVENTION

Even when manufacturing the decorative sheet using the ink jet recording method, the decorative sheet preferably has stretchability and high heat resistance. In other words, in decorative sheets used for in-mold injection forming, there is a demand for stretchability suitable for forming processing and heat resistance preventing image running. There is a tendency for the stretchability and heat resistance to be generally antithetic. For example, when the cross-link density of the cured image using ink for ink jet recording is increased, the heat resistance is improved and there is resistance against ink running; however, the stretchability is sacrificed. Here, the running prevention is a characteristic relating to the heat resistance of the image with respect to the molten resin poured in at the time of injection forming.

One issue that the present invention is trying to solve is to provide a decorative sheet possessing both stretchability and heat resistance. Another issue that the invention is trying to solve is to provide an in-mold forming method capable of forming in-mold injection formed products having an excellent decorative image.

The decorative sheet of the present invention to solve the problems described above comprises an image layer and an image running prevention region in order on a resin sheet, wherein the image layer is a cured image of an ink composition containing (a) a polymerizable compound, (b) a polymerization initiator, and (c) a coloring agent; the image running prevention region is a cured layer of a composition for running prevention containing (a) a polymerizable compound, and (b) a polymerization initiator; and the image running prevention region is superior in heat resistance to the image layer.

Preferably, the decorative sheet is a material for in-mold forming.

Also preferably, the composition for running prevention has a greater mass ratio of a multi-functional polymerizable compound in the total mass of the polymerizable compound than that of the ink composition.

Also preferably, the image running prevention region has a higher glass transition temperature (Tg) than the image layer.

Also preferably, the composition for running prevention includes inorganic particles.

Also preferably, a reflective layer is provided between the image layer and the image running prevention region, and the reflective layer includes a white pigment and/or a metallic powder pigment.

Also preferably, the resin sheet is selected from the group consisting of polycarbonate, polyethylene terephthalate, and acrylic resins.

The in-mold forming method of the present invention includes a step of fixing the decorative sheet of the present invention to an inner wall of a hollow portion formed by a fixed mold and a moving mold arranged to face each other, and a step of injection forming process in which the gate position is arranged at a position facing the image running prevention region so as to cause a molten resin poured into the hollow portion from the gate to come into contact with the image running prevention region.

Preferably, the step of fixing the decorative sheet is a step of fixing the decorative sheet formed by vacuum forming or pressure forming.

According to the present invention, it is possible to provide a decorative sheet having both stretchability and heat resistance. In addition, according to the present invention, it is possible to provide an in-mold forming method capable of manufacturing an in-mold formed product decorated with an image having an excellent image quality.

DESCRIPTION OF THE PREFERRED EMBODIMENTS

The decorative sheet of the present invention includes an image layer and an image running prevention region in order on a resin sheet, in which the image layer is a cured image of an ink composition containing (a) a polymerizable compound, (b) a polymerization initiator, and (c) a coloring agent; the image running prevention region is a cured layer of a composition for running prevention containing (a) a polymerizable compound, and (b) a polymerization initiator; and the image running prevention region has a characteristic of having superior heat resistance to the image layer.

Here, the "heat resistance" is evaluated according to the degree of change when force is applied under a high temperature atmosphere. As an evaluation method of the heat resistance of the image layer and the image running prevention region, deformation/color change at the time of molten resin injection and at the time of blowing high temperature air, measurement of the viscoelastic modulus at high temperature, or the like, may be exemplified.

Further, the "running prevention" is preventing the image layer formed on the decorative sheet by the forming resin injected from the gate in the in-mold forming from being deformed by the heat or damaged by the heat. The "image running prevention region" is a cured layer provided on the image layer for running prevention and is also limited to a specific region.

Below, description will be given of an overview of the decorative sheet with reference to FIG. 1A, 1B and FIG. 2.

Figure 1A:
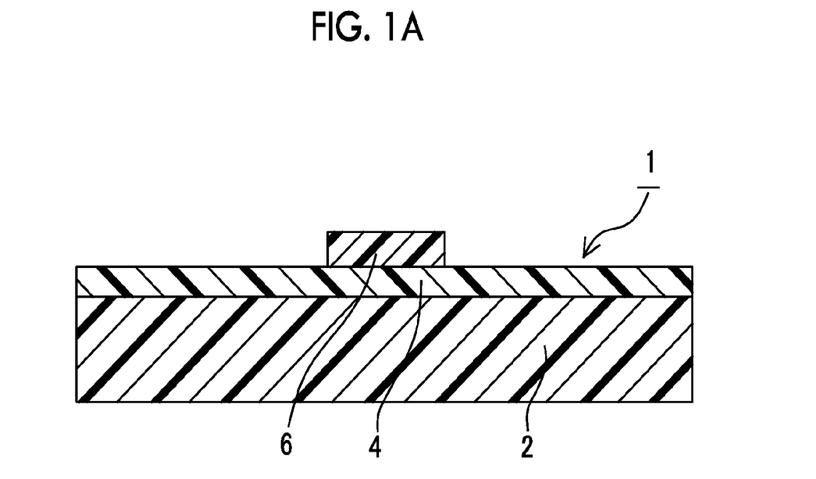
FIGS. 1A and 1B are cross-sectional view schematically showing an example of the decorative sheet and decorated formed product of the present invention.
Figure 1B:
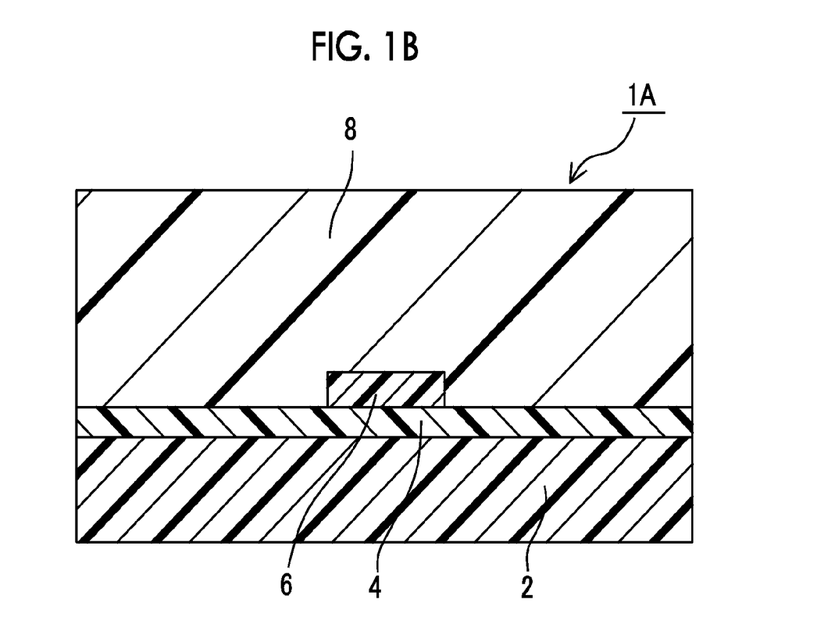

FIGS. 1A and 1B show an example of the decorative sheet 1 and formed product 1A according to the present invention with a schematic cross-sectional view.

In FIG. 1A, the decorative sheet 1 is provided with an image layer 4 and an image running prevention region 6 on a resin sheet 2 in order. This decorative sheet 1 can be used for in-mold forming.

In FIG. 1B, the decorative sheet 1 and the thermoplastic resin 8 are integrally formed into the formed product 1A.

Figure 2:
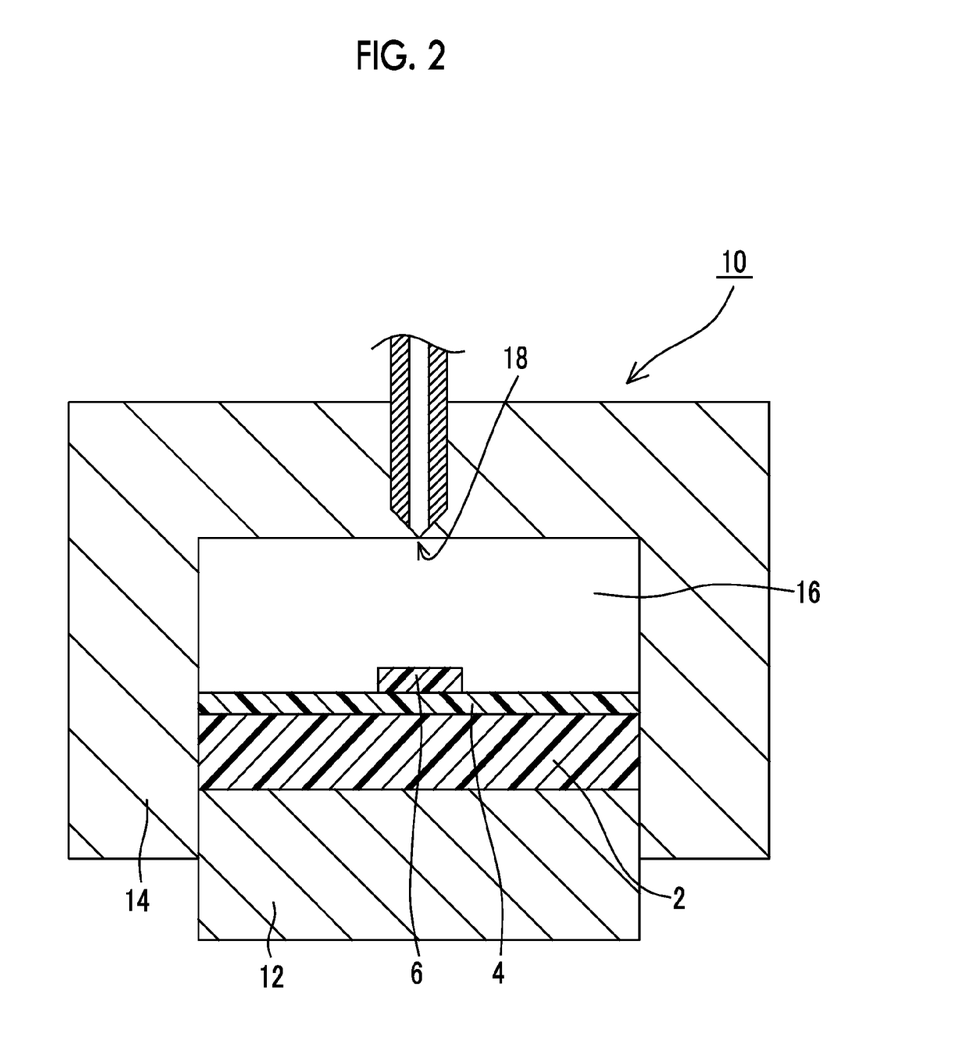
FIG. 2 is a cross-sectional view schematically showing an example of the in-mold forming method of the present invention.

FIG. 2 is a cross-sectional view schematically showing an example of a mold 10 for in-mold forming used in the in-mold forming method using the decorative sheet of the present invention. The decorative sheet 1 having an image layer 4 and an image running prevention region 6 on a resin sheet 2 is positioned and fixed in a hollow portion 16 formed by a fixed mold 12 and a moving mold 14. Thermoplastic resin is poured into the hollow portion 16 from a gate 18 and a product integrally formed with the decorative sheet is manufactured.

Below, detailed description will be given of the material used in the manufacturing of the decorative sheet. After the decorative sheet, detailed description will be given of the in-mold forming.

<Resin Sheet>

The resin sheet used in the present invention configures the base material of the decorative sheet. As the resin sheet, films or sheet of various kinds of synthetic resin having high transparency are preferably used. As preferable examples of the synthetic resin, there are thermoplastic resins, of which, for example, polyesters such as polycarbonate and polyethylene terephthalate; styrenes; and acrylic resins, are representative. In addition, polyolefins such as polyethylene and polypropylene, modified polyphenylene ethers, acrylonitrile butadiene styrene (ABS) copolymers, polyamides, or polymer alloys formed of two or more of these, and the like are used. Among these, polycarbonate is preferable from the point of having suitable heat resistance, impact resistance, transparency, and three-dimensional processability. Further, the thickness of the resin sheet is preferably 0.025 to 1 mm, more preferably 0.03 to 0.8 mm and particularly preferably 0.035 to 0.5 mm. When in this range of thickness, it is possible to prevent damage to the base material by pressure of the molten resin at the time of forming, and the forming of the decorative sheet is easy.

The layer configuration of the resin sheet may be a single layer, or may be a laminated body in which two layers or more of different resins are laminated.

Here, in the present invention, the disclosure of "A to B" (here, B is greater than A) representing the numerical range is the same as "A or more and B or less".

In the thermoplastic resin configuring the resin sheet, additives may be appropriately added according to necessity. As the additives, various additives may be added in appropriate amounts in a range not causing an obstruction in the thermal behavior of the surface gloss, glass transition temperature, or the like. As the additives, ultraviolet absorbers such as benzotriazoles and benzophenones, light stabilizers such as hindered amine radical scavengers, lubricants such as silicone resin and wax, coloring agents, plasticizers, thermal stabilizers, antimicrobial agents, antifungal agents, antistatic agents, and the like may be exemplified.

<Image Layer and Image Running Prevention Region>

On the resin sheet, an image layer and an image running prevention region are sequentially provided as required layers.

The above-described image layer is a cured image of an ink composition (in the present invention, also simply referred to as "ink") containing (a) a polymerizable compound, (b) a polymerization initiator, and (c) a coloring agent. The ink composition is preferably an ink for ink jet recording.

The ink composition and the composition for running prevention are curable, and, as will be described in detail later, addition polymerizable, and are preferably curable by the irradiation of active radiation.

Further, the image running prevention region is a cured layer of a composition for running prevention containing (a) a polymerizable compound, and (b) a polymerization initiator. For the composition for running prevention, (c) the coloring agent is an arbitrary component, and the composition may be a transparent composition not including a coloring agent, or for example, a white composition including a white pigment.

The image layer is preferably provided across the entire surface on the resin sheet. In contrast, the image running prevention region is at least partially provided on the image layer. Although providing the image running prevention region on the entire surface on the image layer is not excluded, it will become apparent from the following description that there is little need for this.

The decorative sheet according to the present invention is preferably used as an in-mold forming material.

The "in-mold forming" refers to manufacturing a product in which the decorative sheet and the thermoplastic resin are integrally formed by fixing a decorative sheet in which an image is formed on a resin sheet to an inner wall of a hollow portion formed by a pair of molds and then injecting a thermoplastic resin into the hollow portion. In in-mold forming, the resin sheet and the image layer may be separated inside the mold after injection forming. In addition, the decorative sheet of the present invention is also preferably used as a film insert forming material "Film insert forming" refers to manufacturing a final product including a resin sheet by integrally forming the decorative sheet fixed inside the mold at the time of injection forming and the poured thermoplastic resin.

The "in-mold forming method" of the present invention is a broader concept of a "film insert forming method", and includes the film insert forming method as well as an in-mold forming method separating a resin sheet.

The in-mold forming method will be described in detail later.

Description will be given of the components of the ink composition and the composition for running prevention used in the present invention.

Since the (a) polymerizable compound and (b) polymerization initiator are common components for forming the image layer and the image running prevention region, first, description will be given below of the polymerizable compound preferably used in the ink composition and the composition for running prevention.

<(a) Polymerizable Compound (Component a)>

Component a is a curable component of the ink composition and the composition for running prevention. "Polymerizable" means addition polymerizable. As the polymerizable compound, a radical-polymerizable compound is more preferable than a cationic polymerizable compound, and an ethylenically unsaturated compound is more preferable.

(Ethylenically Unsaturated Compound)

The "ethylenically unsaturated compound" is a compound having a radical-polymerizable ethylenically unsaturated group and it is not limited as long as it is a compound having at least one ethylenically unsaturated group capable of radical-polymerization in the molecule, furthermore, depending on the molecular weight and number of configuring units, ones having the chemical form of a monomer, an oligomer, a polymer, or the like are included. The ethylenically unsaturated compounds are broadly separated into monofunctional ethylenically unsaturated compounds (monofunctional polymerizable compounds) and multi-functional ethylenically unsaturated compounds (multi-functional polymerizable compounds) according to whether there is one ethylenically unsaturated group in the molecule or a plurality. One kind of the ethylenically unsaturated compound may be used alone, or two kinds or more may be used together at an arbitrary ratio in order to improve the desired characteristics.

Here, as examples of radical-polymerizable ethylenically unsaturated compounds, unsaturated carboxylic acids such as acrylic acid, methacrylic acid, itaconic acid, crotonic acid, isocrotonic acid, maleic acid, and the like and salts thereof, anhydrides having an ethylenically unsaturated group, acrylonitrile, styrene, additional various ethylenically unsaturated compounds such as unsaturated polyester, unsaturated polyether, unsaturated polyamide, unsaturated urethane, and the like, may be exemplified.

The ink composition and the composition for running prevention used in the present invention preferably contain a monofunctional ethylenically unsaturated compound. To form a linear polymer in the cured image, the monofunctional ethylenically unsaturated compound contributes to give a flexible cured image and give stretchability to the image layer.

The ink composition and the composition for running prevention used in the present invention may use multi-functional ethylenically unsaturated compounds together. The multi-functional ethylenically unsaturated compounds increase the cross-linked density of the cured image and improve the heat resistance; however, there is a tendency for the stretchability to deteriorate.

Below, description will be given of the monofunctional ethylenically unsaturated compound and the multi-functional ethylenically unsaturated compound contained in the ink composition and the composition for running prevention used in the present invention.

As the monofunctional ethylenically unsaturated compound, an N-vinyl compound and/or a compound having 5 to 20 carbon atoms and an aliphatic hydrocarbon ring are preferable Below, description will be given of these monofunctional ethylenically unsaturated compounds.

(N-Vinyl Compound)

As the N-vinyl compounds used in the ink composition and composition for running prevention used in the present invention, N-vinyl lactams may be preferably exemplified. As the N-vinyl lactams, the compound represented by formula (a) is preferable.

(a)

In formula (a), n represents an integer of 2 to 6, and, from the viewpoints of flexibility, adhesion to a recording medium after the ink composition is cured, and the availability of raw materials, it is preferable that n is an integer of 3 to 5, more preferable that n is 3 or 5, and particularly preferable that n is 5, that is, N-vinyl caprolactam N-vinyl caprolactam is excellent in terms of safety, is available in generic form at comparatively low cost, and is preferable since it can obtain particularly favorable ink curing as well as favorable adhesion between the cured image and the recording medium, and the cured image and the image running prevention region.

Further, in the above-described N-vinyl lactams, a hydrogen atom on the lactam ring may be substituted with a substituent of an alkyl group, an aryl group or the like, or a saturated or unsaturated ring structure may be linked with the lactam ring.

The compound represented by formula (a) may be used as one kind alone or two or more kinds may be used.

The content of the N-vinyl compound is preferably 5% by mass or more and more preferably 15 to 30% by mass with respect to the respective total masses of the polymerizable compounds in the ink composition and the composition for running prevention. When this blending ratio is used, sufficient hardness is obtained in the image layer, and the heat resistance of the image running prevention region is improved.

(Monofunctional Ethylenically Unsaturated Compound Having 5 to 20 Carbon Atoms and an Aliphatic Hydrocarbon Ring)

The ink composition and the composition for running prevention used in the present invention preferably use a monofunctional ethylenically unsaturated compound having 5 to 20 carbon atoms and an aliphatic hydrocarbon ring as the polymerizable compound of component a.

By using a monofunctional ethylenically unsaturated compound having 5 to 20 carbon atoms and an aliphatic hydrocarbon ring, it is possible to improve the film hardness and heat resistance of the image layer.

As the monofunctional ethylenically unsaturated compound having 5 to 20 carbon atoms and an aliphatic hydrocarbon ring, the compounds represented by formula (I) to formula (III) are preferably used.

(In formula (I) to formula (III), $R^1$ represents a hydrogen atom or a methyl group, $X^1$ represents an ether bond, an ester bond, or an amide bond, $Y^1$ represents a single bond, an ether bond an alkyleneoxy group, or a divalent linking group of a poly (alkyleneoxy) group, $Y^1$ is bonded to an arbitrary position of an aliphatic hydrocarbon ring, $R^2$, $R^3$, and $R^4$ each independently represent a substituent, s, t and u each independently represent an integer of 0 to 5, and n represents a cyclic hydrocarbon structure.)

In formula (I) to formula (III), $R^1$ represents a hydrogen atom or a methyl group, and the hydrogen atom is particularly preferable.

In formula (I) to formula (III), $X^1$ represents an ether bond, an ester bond, or an amide bond, and the ester bond is particularly preferable. The ethylenically unsaturated group is particularly preferably an acryloxy group.

In formula (I) to formula (III), $Y^1$ represents a single bond, an ether bond, an alkyleneoxy group, or a divalent linking group of a poly(alkyleneoxy) group, and $Y^1$ can be bonded to an arbitrary position of an aliphatic hydrocarbon ring. For $Y^1$, the single bond and the alkyleneoxy group are more preferable, and the single bond is particularly preferable.

In formula (I) to formula (III), $R^2$ to $R^4$ each independently represent a substituent, and a linear or branched alkyl group having 1 to 6 carbon atoms is more preferable. A methyl group, an ethyl group, an n-propyl group, an i-propyl group, an n-butyl group, ani-butyl group, and a t-butyl group are even more preferable.

In formula (I) to formula (III), s, t and u each independently represent an integer of 0 to 5, preferably an integer of 0 to 3, and, in a case of being 2 or more, it is possible for $R_2$, $R_3$ and $R_4$ to have one or two bonds to the same carbon atom of the aliphatic hydrocarbon ring.

Although s which is the number of $R^2$ present, t which is the number of $R^3$ present, and u which is the number of $R^4$ present may respectively be the same, they may be different.

In formula (II), as the cyclic hydrocarbon structure represented by n, the following structure may be preferably exemplified.

In formula (II-a) to formula (II-c), $R^1$, $R^3$, $X^1$, $Y^1$, and t have the same meaning as $R^1$, $R^3$, $X^1$, $Y^1$, and t in formula (II).

The compound represented by formula (I) to formula (III) is preferably an acrylate compound in which an acryloxy group is directly bonded to an aliphatic hydrocarbon ring.

As the monofunctional ethylenically unsaturated compound having 5 to 20 carbon atoms and an aliphatic hydrocarbon ring, specifically, the compounds of formula (a-1) to formula (a-12) may be exemplified.

a-1 a-2 a-3 a-4 a-5 a-6 a-7 a-8 a-9 a-10 a-11 a-12

The content of the monofunctional ethylenically unsaturated compound having 5 to 20 carbon atoms and an aliphatic hydrocarbon ring is preferably 1% by mass or more with respect to the respective total masses of the polymerizable compounds in the ink composition and the composition for running prevention, and more preferably 1 to 15% by mass. With this blending ratio, sufficient heat resistance is obtained in the image layer and particularly the image running prevention region.

(Other Monofunctional Ethylenically Unsaturated Compounds)

The ink composition and the composition for running prevention used in the present invention may also contain another monofunctional ethylenically unsaturated compound, and (meth)acrylate compounds other than the described above, vinyl ether compounds, allyl compounds, unsaturated carboxylic acids, and the like may be exemplified. Examples are given below.

As the (meth)acrylate compounds other than the described above, a monofunctional (meth)acrylate compound having an aromatic group represented by the following formula (2) may be exemplified.

(2)

(In formula (2), $R^1$ represents a hydrogen atom or a methyl group, and X represents a single bond or a divalent linking group.)

$R^1$ in formula (2) represents a hydrogen atom or a methyl group, and the hydrogen atom is preferable from the viewpoint of curing speed.

As X in formula (2), an alkylene group, or a group combining one or more alkylene groups and one or more bonds selected from a group consisting of an ether bond, an ester bond, a urethane bond, and a urea bond, may be preferably exemplified, and an alkylene group, an alkyleneoxy group, or a polyalkyleneoxy group may be more preferably exemplified.

For the alkylene group, the alkyleneoxy group, or the polyalkyleneoxy group, the number of carbon atoms is preferably 2 to 10, more preferably 2 to 4, and particularly preferably 2. In addition, the alkylene group, the alkyleneoxy group, or the polyalkyleneoxy group may be substituted, and, as the substituent, an alkyl group, an aryl group, a halogen atom, a hydroxy group and the like may be exemplified.

Among these, as the compounds represented by formula (2), phenoxyethyl (meth)acrylate is preferable and phenoxy ethyl acrylate is particularly preferable.

The content of the compounds represented by formula (2) is preferably 10 to 70% by mass and more preferably 20 to 60% by mass with respect to the respective total masses of the polymerizable compounds in the ink composition and the composition for running prevention. With this blending ratio, sufficient heat resistance is obtained in the image layer and particularly the image running prevention region.

As the other monofunctional ethylenically unsaturated compounds, it is preferable to include a monofunctional (meth)acrylate compound having an aromatic group. In the cyclic structure of the aromatic group of the monofunctional (meth)acrylate compound having the aromatic group, hetero atoms of O, N, S, or the like may be included.

As the monofunctional (meth)acrylate compound having the aromatic group other than the compounds represented by the formula (2), 1-naphthyl (meth)acrylate, 2-naphthyl (meth)acrylate, 2-α-naphthyloxyethyl (meth)acrylate, 2-β-naphthyloxyethyl (meth)acrylate, 2-anthryl (meth)acrylate, 9-anthryl (meth)acrylate, 1-phenanthryl (meth)acrylate, 2-phenanthryl (meth)acrylate, ethylene oxide-modified cresol (meth)acrylate (below, "ethylene oxide" is also referred to as "EO"), p-nonyl phenoxyethyl (meth)acrylate, p-nonylphenoxy polyethylene glycol (meth)acrylate, p-cumylphenoxy ethylene glycol (meth)acrylate, 2-furyl (meth)acrylate, 2-furfuryl (meth)acrylate, 2-thienyl (meth)acrylate, 2-thenyl (meth)acrylate, 1-pyrrolyl (meth)acrylate, 2-pyridyl (meth)acrylate, 2-quinolyl (meth)acrylate, N-(1,1-dimethyl-2-phenyl)ethyl (meth)acrylamide, N-diphenylmethyl (meth)acrylamide, N-phthalimide methyl (meth)acrylamide, N-(1,1-dimethyl-3-(1,2,4-triazol-1-yl))propyl (meth)acrylamide, and the like may be exemplified.

In addition, as examples of other monofunctional (meth)acrylate compound, cyclopentyl (meth)acrylate, cycloheptyl (meth)acrylate, cyclooctyl (meth)acrylate, cyclodecyl (meth)acrylate, acryloyl morpholine, N-ethylphthalimide (meth)acrylate, pentamethyl piperidyl (meth)acrylate, tetramethyl piperidyl (meth)acrylate, 5-(meth)acryloyloxy methyl-5-ethyl-1,3-dioxacyclohexane, 2-ethylhexyl (meth)acrylate, 2-hydroxyethyl (meth)acrylate, 2-butoxyethyl (meth)acrylate, carbitol (meth)acrylate, methyl (meth)acrylate, n-butyl (meth)acrylate, 2-(2-ethoxyethoxy)ethyl (meth)acrylate, 2-(2-butoxyethoxy)ethyl (meth)acrylate, dimethylaminomethyl (meth)acrylate, and the like, may be exemplified.

Monofunctional vinyl ether compounds are also included in the other monofunctional ethylenically unsaturated compounds.

As these kinds of monofunctional vinyl ether compounds, for example, ethylene glycol monovinyl ether, triethylene glycol monovinyl ether, hydroxyethyl monovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, hydroxynonyl monovinyl ether, cyclohexanedimethanol monovinyl ether, n-propyl vinyl ether, isopropyl vinyl ether, dodecyl vinyl ether, diethylene glycol monovinyl ether, and the like may be exemplified.

(Multi-Functional Ethylenically Unsaturated Compound)

In the ink composition and the composition for running prevention used in the present invention, multi-functional (meth)acrylate compounds (multi-functional polymerizable compounds) can be preferably used.

In the multi-functional (meth)acrylate compounds, bifunctional (meth)acrylate compounds and (meth)acrylate compound of three functions or more are included.

As the bifunctional (meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol diacrylate, 2,2-bis(4-(meth)acryloxy polyethoxy phenyl)propane, bis(4-(meth)acryloxy polyethoxy phenyl)propane, and the like, may be exemplified.

Among these, dipropylene glycol di(meth)acrylate is preferable and dipropylene glycol diacrylate is particularly preferable.

As the bifunctional (meth)acrylate compounds, bifunctional (meth)acrylate compounds having a hydrocarbon chain which may have a branch of 5 or more carbon atoms can be preferably used.

As preferable examples of bifunctional (meth)acrylate compounds, there are bifunctional (meth)acrylate compounds having a hydrocarbon chain having 5 or more carbon atoms in the molecule, specifically, neopentyl glycol di(meth)

acrylate, propylene oxide (PO) modified neopentyl glycol di(meth)acrylate, hexanediol di(meth)acrylate, PO modified hexanediol di(meth)acrylate, nonanediol di(meth)acrylate, decanediol di(meth)acrylate, dodecanediol di(meth)acrylate, tridecanediol di(meth)acrylate, octadecanediol di(meth)acrylate, 3-methyl-1,5-pentanediol di(meth)acrylate, 2-n-butyl-2-ethyl-1,3-propanediol di(meth)acrylate, cyclohexane dimethanol di(meth)acrylate, cyclohexane di(meth)acrylate, and the like may be exemplified.

As preferable examples of trifunctional (meth)acrylate compounds, pentaerythritol (meth)acrylate, trimethylolethane tri(meth)acrylate, trimethylolpropane tri(meth)acrylate, and the like may be exemplified. As preferable examples of tetrafunctional (meth)acrylate compounds, pentaerythritol tetra(meth)acrylate, dipentaerythritol tetra(meth)acrylate, and the like may be exemplified.

In addition, a multi-functional vinyl ether compound can also be used in the ink composition and/or composition for running prevention.

As the multi-functional vinyl ether compound which can be suitably used, for example, di or tri vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane tri-vinyl ether may be exemplified.

In the present invention, the content of the multi-functional ethylenically unsaturated compound (multi-functional polymerizable compound) with respect to the total mass of the polymerizable compound of the ink composition is preferably 0 to 20% by mass, more preferably 0 to 15% by mass, and particularly preferably 1 to 10% by mass.

In the present invention, the content of the multi-functional ethylenically unsaturated compound (multi-functional polymerizable compound) with respect to the total mass of the polymerizable compound of the composition for running prevention is preferably 5 to 100% by mass, more preferably 10 to 100% by mass, and particularly preferably 20 to 100% by mass.

The ink composition and the composition for running prevention used in the present invention preferably use a monofunctional ethylenically unsaturated compound and a multi-functional ethylenically unsaturated compound together. However, with respect to the ink composition, the composition for running prevention which forms the image running prevention region preferably has a greater mass ratio of the multi-functional ethylenically unsaturated compound (multi-functional polymerizable compound) in the total mass of the polymerizable compound. This is because the heat resistance of the cured layer of the composition for running prevention of the image running prevention region is made greater than that of the cured image of the ink composition of the image layer.

In the decorative sheet of the present invention, it is preferable that the glass transition temperature (Tg) of the cured layer (image running prevention region) of the composition for running prevention is made greater than that of the cured image (image layer) of the ink composition. The glass transition temperature can be measured by measuring the elastic modulus of the cured image at a constant temperature rising rate.

As a prescription for raising the Tg, increasing the content of the above-described N-vinyl compound and/or the monofunctional ethylenically unsaturated compound having 5 to 20 carbon atoms and an aliphatic hydrocarbon ring of the composition for running prevention to be greater than the ink composition is included. In addition, improving the ratio of the multi-functional ethylenically unsaturated compound/monofunctional ethylenically unsaturated compound and increasing the cross-linking density also improves the glass transition temperature.

<(b) Polymerization Initiator>

The ink composition and the composition for running prevention used in the present invention contain (b) a polymerization initiator.

Polymerization initiators are broadly classified into thermal polymerization initiators and photopolymerization initiators and either can be used in the present invention; however, a photopolymerization initiator is preferably used. In such a case, the ink composition and the composition for running prevention ejected on to the resin sheet are cured by irradiation with active radiation. This is because the photopolymerization initiator included in the ink composition and the composition for running prevention is decomposed by the irradiation with active radiation, generates a polymerization initiation seed such as a radical, and addition polymerization of the polymerizable compound is started by the action of the starting seed.

Here, the polymerization initiator in the present invention also includes compounds (commonly called sensitizers) absorbing specific active radiation and promoting the decomposition of the polymerization initiator as well as compounds absorbing external energy of active radiation or the like and generating a polymerization initiation seed.

In the ink composition or the composition for running prevention of the present invention, when there is a polymerization initiator and a sensitizer, the sensitizer of the system also absorbs active radiation and enters an excited state, the decomposition of the polymerization initiator is promoted by the mutual action with the polymerization initiator, whereby it is possible to achieve a curing reaction with higher sensitivity. As the sensitizers, for example, those described in JP2008-208190A may be exemplified.

As the polymerization initiator used in the present invention, it is preferable that a thioxanthone compound (component b-1) and a bisacylphosphine compound (component b-2) be contained. By combining the polymerization initiator and the polymerizable compound, an ink for ink jet recording which can form a cured layer with excellent film hardness, stretchability at high temperatures, and ink running resistance is obtained.

Below, description will be given of the compound of component b-1 and component b-2.

<Thioxanthone Compound (Component b-1)>

The ink compositions used in the present invention can preferably contain a thioxanthone compound (component b-1).

As the thioxanthone compound, there is no particular limitation and well-known compounds can be used; however, it is preferably the compound represented by formula (D-1).

In the formula (D-1), $R^{1F}$, $R^{2F}$, $R^{3F}$, $R^{4F}$, $R^{5F}$, $R^{6F}$, $R^{7F}$, and $R^{8F}$ each independently represent a hydrogen atom, an alkyl group, a halogen atom, a hydroxy group, a cyano group, a nitro group, an amino group, an alkylthio group, an alkylamino group (including cases of one substitution and two substitutions, note that the same applies below), an alkoxy group, an alkoxycarbonyl group, an acyloxy group, an acyl group, a carboxy group or a sulfa group. The number of carbon atoms of the alkyl portion in the above-described alkyl group, alkylthio group, alkylamino group, alkoxy group, alkoxycarbonyl group, acyloxy group, and acyl group is preferably 1 to 20, more preferably 1 to 8, and even more preferably 1 to 4.

Two of $R^{1F}$, $R^{2F}$, $R^{3F}$, $R^{4F}$, $R^{5F}$, $R^{6F}$, $R^{7F}$, and $R^{8F}$ which are respectively adjacent may be connected and form a mutually bonded ring. As the ring structure of a case where these form a ring, a five or six-membered aliphatic ring, aromatic ring, or the like may be exemplified and the ring may be a heterocyclic ring including an element other than carbon atoms. In addition, a binuclear ring in which the formed rings are further combined, for example, a condensed ring, may be formed. These ring structures may further be substituted. As the substituent, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group and a sulfo group may be exemplified. As examples of the hetero atom of the case where the formed ring structure is a heterocyclic ring, N, O, and S can be exemplified.

As thioxanthone compounds, from the viewpoint of curability, thioxanthone, 2,3-diethyl thioxanthone, 2,4-diethyl thioxanthone, 2,4-dichloro thioxanthone, 1-chloro-4-propoxy thioxanthone, 2-cyclohexyl thioxanthone, 4-cyclohexyl thioxanthone, 2-isopropyl thioxanthone, and 4-isopropyl thioxanthone are preferable, and 2-isopropyl thioxanthone and 4-isopropyl thioxanthone are more preferable.

The content of component b-1 is preferably 0.1 to 5.0% by mass of the total mass of the ink composition or the composition for running prevention, and more preferably 0.5 to 3.0% by mass.

<(Component b-2) Bisacylphosphine Compound>

As the (component b-2) bisacylphosphine compound, there are no particular limitations and well-known compounds can be used; however, it is preferably the compound represented by formula (D-2).

(D-2)

(In the formula (D-2), $R^{1E}$ $R^{2E}$ and $R^{3E}$ each independently represent an aromatic hydrocarbon group which may have a methyl group or an ethyl group as a substituent.)

As the bisacylphosphine compound, bis(2,4,6-trimethylbenzoyl)phenyl phosphine oxide (IRGACURE 819: manufactured by Ciba-Japan Co., Ltd.), bis(2,6-dimethoxybenzoyl)-2,4,4-trimethyl pentyl phosphine oxide, and the like, are preferable.

The content of component b-2 is preferably 1 to 8% by mass of the total mass of the ink composition or the composition for running prevention, and more preferably 2 to 7% by mass.

A preferable aspect of component b in the present invention is one including component b-1, and more preferably, one containing both of component b-1 and component b-2.

The total content of component b in the present invention is preferably 0.1 to 15.0% by mass of the total mass of the ink composition or the composition for running prevention, more preferably 1.0 to 12.0% by mass, and even more preferably 2.0 to 10.0% by mass.

In the above range, when using component a to component c in combination, an ink composition with excellent image layer hardness and stretchability at high temperatures may be obtained.

The ink composition or the composition for running prevention of the present invention may include polymerization initiators other than the polymerization initiators of components b-1 and b-2. As such other polymerization initiators, monoacyl phosphine compounds, α-hydroxy ketones, α-amino alkyl ketones, aromatic ketones, aromatic onium salt compounds, organic peroxides, thio compounds, hexaarylbiimidazole compounds, keto oxime ester compounds, borate compounds, azinium compounds, metallocene compounds, active ester compounds, compounds having a carbon-halogen bond, and the like, may be exemplified.

The details of the above-described polymerization initiators are known to persons skilled in the art, and, for example, are described in paragraphs 0090 to 0116 of JP2009-185186A.

<(c) Coloring Agent>

In order to form the image layer, in particular, a colored image, and preferably to form a full color image, the ink composition for use in the present invention contains a coloring agent. As the coloring agent, there are no particular limitations; however, pigments and oil-soluble dyes having excellent weather resistance and rich color reproducibility are preferable, and it is possible to make an arbitrary selection from well-known coloring agents in the ink jet field and make use thereof. In order not to deteriorate the sensitivity of the curing reaction by active radiation, a coloring agent which does not prohibit or suppress the polymerization reaction is preferably selected.

As the pigments which can be used in the present invention, there are no particular limitations; however, for example, the following numbered organic or inorganic pigments described in the Color Index can be used.

As red or magenta pigments, C.I. pigment red 3 (also referred to as "Pigment Red 3"), 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 202, 208, 216, 226, 257, C.I. pigment violet 3 (also referred to as "Pigment Violet 3"), 19, 23, 29, 30, 37, 50, 88, C.I. pigment orange 13 (also referred to as "Pigment Orange 13"), 16, 20, 36, and, as the blue or cyan pigment, C.I. pigment blue 1 (also referred to as "Pigment Blue 1"), 15, 15:1, 15:2, 15:3, 15:4, 15:6, 16, 17:1, 22, 27, 28, 29, 36, 60, as the green pigment, C.I. pigment green 7 (also referred to as "Pigment Green 7"), 26, 36, 50, as a yellow pigment, C.I. pigment yellow 1 (also referred to as "Pigment Yellow 1"), 3, 12, 13, 14, 17, 34, 35, 37, 55, 74, 81, 83, 93, 94, 95, 97, 108, 109, 110, 120, 137, 138, 139, 150, 153, 154, 155, 157, 166, 167, 168, 180, 185, 193, as a black pigment, C.I. pigment black 7 (also referred to as "Pigment Black 7"), 28, 26, as a white pigment, C.I. pigment white 6 (also referred to as "Pigment White 6"), 18, 21, or the like can be used according to the purpose.

In the present invention, it is possible to use a disperse dye in a range capable of being dissolved in a hydrophobic organic solvent. The disperse dyes generally include water-soluble dyes; however, in the present invention, these are preferably used in a range capable of being dissolved in a hydrophobic organic solvent.

As preferable specific examples of the disperse dye, C.I. Disperse Yellow 5, 42, 54, 64, 79, 82, 83, 93, 99, 100, 119, 122, 124, 126, 160, 184:1, 186, 198, 199, 201, 204, 224, and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1, and 9, and the like may be exemplified.

It is preferable that the coloring agent be finely dispersed in the ink composition to a moderate extent after being added to the ink composition. For the dispersion of the coloring agent, it is possible to use various dispersion apparatuses such as, for example, a ball mill, a sand mill, an attritor, a roll mill, an agitator, a Henschel mixer, a colloid mill, an ultrasonic homogenizer, a pearl mill, a wet jet mill, and a paint shaker.

The coloring agent may be added directly with each component during preparation of the ink composition. In addition, in order to improve dispersion, it may be added in advance to a solvent or a dispersion medium such as the polymerizable compound used in the present invention and blended after uniform dispersion or dissolution.

In the present invention, in order to avoid the problems of the deterioration of solvent resistance when solvent remains in the cured image and of VOC (Volatile Organic Compounds) of the remaining solvent, the coloring agent is preferably added in advance to the dispersion medium such as the polymerizable compound, and blended. In other words, the ink composition and the composition for running prevention used in the present invention preferably do not contain a solvent. In addition, when considering only the viewpoint of dispersion suitability, as the polymerizable compound to be used for the addition of the coloring agent, a compound with comparatively low viscosity is preferably selected. One kind or two or more kinds of coloring agents may be suitably selected and used depending on the intended use of the ink composition.

In addition, when using a coloring agent such as a pigment still existing as a solid in the ink composition, it is preferable to set the coloring agent, dispersing agent, selection of the dispersion medium, dispersion conditions, and filtration conditions so that the average particle diameter of the coloring agent particles is preferably 0.005 to 0.5 µm, more preferably 0.01 to 0.45 µm, even more preferably 0.015 to 0.4 µm. According to this particle diameter management, clogging of the head nozzle is suppressed, and it is possible to maintain storage stability, transparency and curing sensitivity of the ink composition, which is therefore preferable.

The content of the coloring agent in the ink composition is appropriately selected according to the color and intended purpose; however, it is preferably 0.01 to 30% by mass with respect to the total mass of the ink composition.

<Dispersing Agent>

The ink composition used in the present invention preferably contains a dispersing agent. In particular, in a case of using a pigment, in order to stably disperse the pigment in the ink composition, it is preferable that a dispersing agent be contained. As the dispersing agent, a polymeric dispersing agent is preferable. Here, the term "polymeric dispersing agent" in the present invention means a dispersing agent in which the weight average molecular weight is 1,000 or more.

<Other Components>

The ink composition used in the present invention may contain, as necessary, in addition to each component above, a surfactant, a polymerization inhibitor, co-sensitizer, a chain transfer agent, an ultraviolet absorber, an antioxidant, an antifading agent, conductive salts, solvents, basic compounds, and the like. As these other components, well-known ones can be used, for example, those described in JP2009-221416A may be exemplified.

<Composition for Running Prevention>

The composition for running prevention is a curable composition having essential components of (a) a polymerizable compound, and (b) a polymerization initiator. Since component a and component b are in common with the ink composition, duplicate description thereof will be omitted. The composition for running prevention does not have (c) a coloring agent as an essential component. However, this does not exclude that (c) a coloring agent be contained.

In the decorative sheet of the present invention, it is preferable that the composition for running prevention contain inorganic particles.

In the inorganic particles, colorless or colored inorganic pigments are included. As examples of these inorganic pigments, silica, alumina, boehmite, synthetic silica particles, alumina silicate synthetic particles, vapor phase synthetic silica, zeolite, montmorillonite group minerals, beidellite group minerals, saponite group minerals, hectorite group minerals, stevensite group minerals, hydrotalcite group minerals, smectite group minerals, bentonite group minerals, calcium carbonate, magnesium carbonate, calcium sulfate, barium sulfate, titanium oxide, titanium, zinc oxide, zinc carbonate, aluminum silicate, calcium silicate, silicate magnesium, kaolin, talc, aluminum oxide, aluminum hydroxide, polyaluminum hydroxide compound, alumina hydrate, plastic pigments, urea resin pigments, cellulose particles, starch particles, silica-alumina composite particles, and the like, may be exemplified.

Among these, the vapor phase synthetic silica, silica, alumina, and boehmite are preferably contained in the composition for running prevention, and the alumina is more preferably contained. This is in order to improve the heat resistance of the cured layer.

<Formation of Cured Film in Image Running Prevention Region>

The image layer and the image running prevention region can be sequentially formed by different processes. In such a case, the image layer is formed on the resin sheet by an ink jet recording method, then, the image running prevention region is formed by an ink jet recording method.

Both of the image layer and the image running prevention region may be formed at the same time. In such a case, the ink composition and the composition for running prevention are printed onto the resin sheet from the same ink jet nozzles.

The ink composition and the composition for running prevention are cured by a polymerization reaction, preferably by radical addition polymerization, and, it is possible to respectively form the cured image of the ink composition or the cured layer of the composition for running prevention.

As described for the (b) polymerization initiator, according to whether a thermal polymerization initiator or a photopolymerization initiator is used as the polymerization initiator, a heating method or an active radiation irradiating method is used as the curing method.

With respect to the ink composition or the composition for running prevention containing the photopolymerization initiator preferably used in the invention, curing is performed by the irradiation of active radiation thereupon.

As a light source for curing, well-known light sources including well-known ultraviolet rays can be used. As a light source for curing, a metal halide lamp, an LED (light emitting diode), or the like are preferably used, and the LED is more preferably used.

<Layer Configuration of Decorative Sheet>

The decorative sheet has the image layer and the image running prevention region described above as essential layers on the resin sheet.

Between the image layer and the image running prevention region, there may be a reflective layer as an arbitrary layer, and, in such a case, the reflective layer preferably includes white pigment and/or metal powder pigment. The reflective layer may be formed by a curable ink including a white pigment using an ink jet recording method, and may be formed on the entire surface of the resin sheet using coating means such as overcoating or printing means such as a silk screen. When the reflective layer is provided, it is possible to observe the image layer through the resin sheet.

Instead of being provided between the image layer and the image running prevention region, the reflective layer may be provided on the image layer and the image running prevention region by the coating means or the printing means.

After forming the image layer and the image running prevention region on the resin sheet, or, after providing the reflective layer between the image layer and the image running prevention region, it is also preferable to provide a layer containing a binder on these layers in order to further improve the adhesion with the injection forming resin. This binder-containing layer may be formed by an ink-jet recording method, or may be formed by coating means such as overcoating.

<In-Mold Forming Method>

The in-mold forming method of the present invention comprises a step of fixing the decorative sheet of the present invention to the inner wall of the hollow portion formed by the plurality of molds, and a step of injection forming in which the gate position is arranged at a position facing the image running prevention region so as to cause the molten resin poured into the hollow portion from the gate comes into contact with the image running prevention region.

Below, description will be given of this forming method.

The first essential process in the in-mold forming method of the present invention is a process of fixing the decorative sheet of the present invention to the inner wall of the hollow portion formed by the plurality of molds.

In the present invention, the injection forming is performed by an injection forming machine. The molds used to make formed products are preferably configured by a fixed mold and a moving mold arranged to face each other, whereby a hollow portion interposed between both the molds is formed. In addition, regarding the molds, usually, after the forming material filled in the cavity through a sprue, a runner, and a gate is cooled and solidified, the molds are automatically opened and the formed products are made by being taken out therefrom.

Here, the hollow portion, which is also called a cavity, is a space portion corresponding to the shape of the formed product. This process is a process of positioning and fixing the decorative sheet having the printed image layer and image running prevention region inside the hollow of the molds. In this case, the image layer of the decorative sheet is fixed so as to become the inner wall of the hollow portion.

After vacuum forming or pressure forming the decorative sheet of the present invention in advance, it is possible to perform fixing the decorative sheet inside the molds. By vacuum forming or pressure forming, it is possible to perform forming the decorative sheet into a shape matching a part of the shape of the external appearance of the final product. In this case, in the first process, the decorative sheet formed in advance by vacuum forming or pressure forming is fixed inside the molds, preferably in the fixed mold.

The stretching rate of the decorative sheet in the vacuum forming or pressure forming is preferably 200% or less in all regions of the entire decorative sheet, and more preferably 150% or less. In addition, in many cases, when a solid body having a thickness is formed into a shape divided into two, there is a tendency for the stretching rate of the peripheral portions to increase.

The second essential process in the in-mold forming method of the present invention is an injection forming process in which the gate position is arranged at a position facing the image running prevention region so that the molten resin poured into the hollow portion from the gate comes into contact with the image running prevention region.

Here, in the mold for injection forming, the "gate" refers to a inlet for pouring the molten resin which is the forming material into the cavity. The gate position has several candidates suitable for the shape to be formed. In the present invention, the image running prevention region is provided at a position facing the gate position and has a protective function of preventing running of the cured image due to the poured molten resin.

The image running prevention region is preferably set at a place where the stretching rate of the decorative sheet is low, more preferably at a region having a stretching rate of less than 20%, and is particularly preferably provided in the vicinity of the central portion of the decorative sheet.

In the injection forming, it is possible to use a resin well-known to a person skilled in the art as the thermoplastic resin poured into the hollow portion. These resins include acrylonitrile butadiene styrene (ABS) resin, polycarbonate (PC) resin, polypropylene (PP) resin, polyethylene (PE) resin, and polyethylene terephthalate (PET) resin. Further, a mixed resin including at least one kind thereof may be used.

The injection forming conditions are suitably determined according to the type of the thermoplastic resin to be poured, the shape of the formed product, and the like. Adopting the case of ABS resin as an example, it is preferable that the cylinder temperature be 180 to 260° C., the mold temperature be 40 to 80° C., and the injection pressure be 500 to 1,800 kgf/cm$^2$ (49 to 177 MPa).

In the in-mold forming method of the present invention, when the product is taken out from the mold after the injection forming process, a decorated formed product is obtained.

As already mentioned, in in-mold forming, the resin sheet may be separated from the image layer inside the molds. On the other hand, film insert forming integrally forms the decorative sheet fixed to the inside of the mold during the injection forming and the poured resin.

In-mold forming and film insert forming have been applied in a large number of fields, such as consumer electronics, communications, general goods, and the like, and have been developed into widely adopted forming methods. They have made a significant contribution to the spread of mobile phones in recent years and have become an indispensable technique in display windows.

EXAMPLES

The present invention will be more specifically described in the examples and comparative examples shown below. However, the present invention is not limited by these examples.

Here, "parts" in the following description indicate "parts by mass" unless otherwise noted and "%" is assumed to represent "% by mass".

The details of the materials used in the present invention are as shown below.

CINQUASIA MAGENTA RT-355-D (magenta pigment, made by BASF Japan Ltd.)

SOLSPERSE32000 (dispersant, manufactured by Lubrizol Japan Ltd.)

NVC (V-CAP, N-vinyl caprolactam, manufactured by ISP Japan Ltd.)

HDDA (SR238B, 1,6-hexanediol diacrylate, manufactured by Sartomer Co. Inc.)

DPGDA (SR508, dipropylene glycol diacrylate, manufactured by Sartomer Co. Inc.)

DVE-3 (RAPI-Cure DVE-3, triethylene glycol divinyl ether, manufactured by ISP Japan Co., Ltd.)

NPGPODA (SR9003, PO-modified neopentyl glycol diacrylate, manufactured by Sartomer Co. Inc.)

PEA (SR339, phenoxyethyl acrylate, manufactured by Sartomer Co. Inc.)

IBOA (SR506, isobornyl acrylate, manufactured by Sartomer Co. Inc.)

CN307 (polybutadiene diacrylate oligomer, manufactured by Sartomer Co. Inc.)

CN964A85 (aliphatic urethane acrylate oligomer, bifunctional equivalent, manufactured by Sartomer Co. Inc.)

TPO (DAROCUR TPO, mono acyl phosphine photopolymerization initiator, manufactured by BASF Japan Ltd.)

IRG819 (IRGACURE819, bisacylphosphine photopolymerization initiator, manufactured by BASF Japan Ltd.)

ITX (sensitizer, isopropyl thioxanthone, manufactured by Shell Chemicals Japan Ltd.)

Karenz MT-PE1 (chain transfer agent, manufactured by Showa Denko Co., Ltd.)

KF-353 (silicone-based surfactant, manufactured by Shin-Etsu Chemical Co., Ltd.)

UV-12 (polymerization inhibitor, manufactured by Chromachem Co., Ltd)

NANOBYK3601 (alumina dispersion, D50=40 nm, BYK-Chemie Japan.)

<Preparation of Magenta Mill Base (Pigment Dispersion)>

Magenta pigments: CINQUASIA MAGENTA RT-355D: 30 parts by mass

PEA (phenoxyethyl acrylate): 60 parts by mass

SOLSPERSE32000: 10 parts by mass

The above components were stirred and a magenta mill base was obtained. In addition, in the preparation of the pigment mill base, each component was placed into a disperser motor mill M50 (manufactured by Eiger Corp.), and dispersion was performed for 8 hours at a cycle speed of 9 m/s using zirconia beads of 0.65 mm diameter.

<Preparation of Ink Compositions 1 to 3 for Image Layer>

The above-described magenta mill base, and a monomer, an oligomer, a polymerization initiator, a sensitizer, and other additives described in the image layer components of Table 1 were respectively added and mixed in the adding amounts described in Table 1, and stirred at high speed, whereby the ink compositions 1 to 3 for a magenta image layer were respectively obtained.

<Preparation of Compositions for Running Prevention 1 to 3 for Image Running Prevention Region>

A monomer, an oligomer, a polymerization initiator, a sensitizer, a polymerization inhibitor, a surfactant and other additives indicated in the components of the image running prevention region of Table 2 were respectively added and mixed in the adding amounts described in Table 2, and stirred at high speed, whereby the compositions for running prevention 1 to 3 for the image running prevention region were respectively obtained.

<Preparation of Examples 1 to 4 and Comparative Examples 1 to 3>

Using one of any of the ink compositions 1 to 3 for the image layer prepared as described above and one of any of compositions for running prevention 1 to 3 for the image running prevention region, the image layer and the image running prevention region on the resin sheet were provided in this order in the configuration described in Table 3 using the ink jet image recording method shown below.

In Examples 2 and 3, between the image layer and the image running prevention region, a white layer (reflective layer) was also provided by screen printing. The screen printing conditions were as follows.

Conditions of screen printing: screen ink/IPX675 (white, manufactured by Teikoku Printing Inks Mfg. Co., Ltd.) and solvent/F-003 (manufactured by Teikoku Printing Inks Mfg. Co., Ltd.) were used.

10% by mass of F-003 as a solvent and 8% by mass of curing agent #200 (manufactured by Teikoku Printing Inks Mfg. Co., Ltd.) were added to IPX675, and mixed, and the resultant was screen printed by a 250 mesh onto the installed magenta image layer by the above-described ink jet image recording method, dried for 15 minutes at 65° C., whereby a sample was obtained.

(Ink-Jet Image Recording)

Recording was performed on the recording medium using an ink jet recording apparatus having a piezo-type inkjet nozzle.

The ink supply system was formed of a source tank, a supply pipe, an ink supply tank put in just before the ink jet head, a filter, and a piezo-type ink jet head, and insulation and heating were performed from the ink supply tank up to the ink jet head portion. Temperature sensors were respectively provided in the vicinity of the ink supply tank and the ink jet head nozzle and temperature control was performed such that the nozzle portion was always at 40° C.±2° C. The piezo-type ink jet head was driven so as to be able to inject 1 to 10 pl multi-size dots at a resolution of 600×600 dpi. After landing, UV light was condensed so that an exposure area illumination become 1,200 mW/cm$^2$, and the exposure system, main scanning speed, and injection frequency were adjusted so that irradiation began 0.1 seconds after the ink composition landed on the recording medium. Further, the exposure energy was irradiated with varied exposure times. For the ultraviolet lamp, a UV-LED lamp (manufactured by Matsushita Electric Works Co., Ltd.) was used. Here, the dpi referred to in the present invention represents the number of dots per 2.54 cm.

As the recording medium, polycarbonate (500 μm thickness, manufactured by Teijin Chemicals Co., Ltd., product name: Panlite) was used.

In the ultraviolet irradiation, since the image is formed by the head making six passes, the ink dropped first is irradiated with an exposure amount equivalent to six passes. Since the exposure amount of one pass is approximately 50 mJ/cm$^2$, in the case of six passes, the total exposure amount becomes 300 mJ/cm$^2$.

Regarding the samples of the examples and the comparative examples prepared in the above manner, evaluation of the heat stretching rate and the ink running resistance was performed. Each evaluation method was as follows, and the evaluation results are described in Table 3.

According to the ink jet image recording method, on a sheet of a transparent material (polycarbonate), samples of the Examples 1 to 4 and the Comparative Examples 1 to 3 were created using combinations of the ink composition for the image layer and the composition for running prevention for the image running prevention region described in Table 3 as the Examples and the Comparative Examples. In addition, ink printing was performed such that the image layer became a solid image having an average film thickness of 30 μm. In addition, the image running prevention region was created such that the cured image became a cured layer having an average thickness of 30 μm using the same ink jet image recording method as the image layer.

<Evaluation of Stretchability>

A 5 cm×2 cm measurement piece was cut from each obtained sample, and the stretching rate was measured by performing tensile testing under the following temperature conditions using the stretching machine described below.

Machine used: Tensilon (manufactured by Shimadzu Corp.)

Measurement conditions: temperature 180° C., tensile speed 50 mm/min

The stretching rate was calculated by measuring the length at the time of breaking. Here, the stretching rate was determined by {(length at time of breaking-length before stretching)/length before stretching}×100. ((Example) In a case of breaking at 10 cm, the stretching is calculated as {(10 cm−5 cm)/5 cm}×100=100%.)

The evaluation criteria of the heating stretching are as follows.

A: stretching rate of 150% or more
B: stretching rate of 100% or more to less than 150%
C: stretching rate of 50% or more to less than 100%
D: stretching rate of less than 50%

In the evaluation, A is the most excellent, and the evaluations A to C are in a range in which there are no problems with practical use.

<Evaluation of Ink Running Resistance>

According to the ink jet recording method, on a resin sheet of a transparent material (polycarbonate), the decorative sheet was manufactured by performing ink printing of a solid image having an average film thickness of 30 µm such that the Examples and Comparative Examples adopted the configurations described in Table 3.

Using the SG-50 manufactured by Sumitomo Heavy Industries Co., Ltd. as an injection forming device, the decorative sheet was fixed to the inner wall of the hollow portion of 5.5 cm×5.5 cm formed by the fixed mold and the moving mold, the gate position was provided at a position facing the image running prevention region such that the molten resin poured from the gate came into contact with the image running prevention region of the decorative sheet, and injection forming was performed. Injection forming was performed by injecting ABS (acrylonitrile butadiene styrene) resin of 220° C. from the gate facing the image running prevention region of the decorative sheet. The ink running resistance of the formed products was evaluated.

The evaluation criteria of the ink running resistance were set to the following four-stage criteria.

A: The reduction of the film thickness at the injected place was less than 20%.
B: The reduction of the film thickness at the injected place was 20% or more to less than 100%.
C: The film at the injected place was lost, and the radius of the portion where the film was lost was less than 2 mm.
D: The film at the injected place was lost, and the radius of the portion where the film was lost was 2 mm or more.

Evaluation A is the most excellent, and the evaluations A and B are in a range in which there are no problems with practical use.

TABLE 1

|  |  | Ink Composition | | |
|---|---|---|---|---|
|  |  | 1 | 2 | 3 |
| Pigment Dispersion | Magenta Pigment Dispersoid (Containing 60% PEA) | 15 | 15 | 15 |
| Monomer | NVC | 30 | 30 | — |
|  | IBOA | 5 | 5 | — |
|  | PEA | 38 | 33 | — |
|  | HDDA | — | 5 | — |
|  | DPGDA | — | — | 41 |
|  | DVE-3 | — | — | 14 |
|  | NPGPODA | — | — | 7 |
| Oligomer | CN964A85 | 5 | 5 | 5 |
| Polymerization Initiator | IRG819 | 3 | 3 | — |
|  | TPO | — | — | 14 |

TABLE 1-continued

|  |  | Ink Composition | | |
|---|---|---|---|---|
|  |  | 1 | 2 | 3 |
| Sensitizer | ITX | 1 | 1 | 1 |
| Chain Transfer Agent | Karenz MT-PE1 | 1 | 1 | 1 |
| Polymerization Inhibitor | UV-12 | 1 | 1 | 1 |
| Surfactant | KF-353 | 1 | 1 | 1 |
| Total (Mass %) |  | 100 | 100 | 100 |

TABLE 2

|  |  | Composition For Running Prevention | | |
|---|---|---|---|---|
|  |  | 1 | 2 | 3 |
| Monomer | DPGDA | 58 | — | — |
|  | DVE-3 | 14.07 | — | — |
|  | NPGPODA | 7 | — | — |
|  | NVC | — | 30 | 30 |
|  | IBOA | — | 10 | 10 |
|  | PEA | — | 55 | 25 |
| Oligomer | CN964A85 | 4.88 | — | — |
| Polymerization Initiator | IRG 819 | — | 3 | 3 |
|  | TPO | 14 | — | — |
| Sensitizer | ITX | 0.05 | 1 | 1 |
| Chain Transfer Agent | Karenz MT-PE1 | — | 1 | 1 |
| Polymerization Inhibitor | UV-12 | 1 | — | — |
| Surfactant | KF-353 | 1 | — | — |
| Alumina dispersion | NANOBYK3601 | — | — | 30 |
| Total (Mass %) |  | 100 | 100 | 100 |

Using the compositions 1 to 3 for running prevention, a sheet was manufactured by performing the forming of the image running prevention region with the same method as the ink jet image recording method. Thereafter, using the SG-50 made by Sumitomo Heavy Industries Co., Ltd. as an injection forming device, the sheet was fixed to the inner wall of the hollow portion of 5.5 cm×5.5 cm formed by the fixed mold and the moving mold, the gate position was provided at a position facing the image running prevention region such that the molten resin poured from the gate came into contact with the image running prevention region of the sheet, and injection forming was performed. Injection forming was performed by injecting ABS (acrylonitrile butadiene styrene) resin of 220° C. from the gate facing the image running prevention region of the sheet. Evaluation of the ink running resistance was performed with respect to the image running prevention region after injection forming.

As the results of the evaluation of the ink running resistance, the evaluation of the composition for running prevention 1 was B, the evaluation of the composition for running prevention 2 was D, and the evaluation of the composition for running prevention 3 was A. Here, that the ink running resistance is favorable signifies that the heat resistance is favorable.

TABLE 3

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Layer configuration | Image layer | Ink 1 | Ink 1 | Ink 2 | Ink 1 | Ink 1 | Ink 1 | Ink 3 | Ink 2 |
| | Image running prevention region | Composition for running prevention 1 | Composition for running prevention 1 | Composition for running prevention 1 | Composition for running prevention 3 | None | Composition for running prevention 2 | None | None |
| | White layer | None | Present | Present | None | None | None | None | None |
| Evaluation Result | Stretchability | A | A | B | A | A | A | D | B |
| | Ink running resistance | B | A | A | A | D | D | B | C |

What is claimed is:

1. A decorative sheet comprising:
   an image layer and an image running prevention region in order on a resin sheet,
   wherein the image layer is a cured image of an ink composition containing (a) a polymerizable compound, (b) a polymerization initiator, and (c) a coloring agent,
   the image running prevention region is a cured layer of a composition for running prevention containing (a) a polymerizable compound, and (b) a polymerization initiator,
   the composition for running prevention contains inorganic particles, the inorganic particles being alumina, and
   the image running prevention region is superior in heat resistance to the image layer.

2. The decorative sheet according to claim 1, which is a material for in-mold forming.

3. The decorative sheet according to claim 1, wherein, the composition for running prevention has a greater mass ratio of a multi-functional polymerizable compound in a total mass of the polymerizable compound than that of the ink composition.

4. The decorative sheet according to claim 2, wherein, the composition for running prevention has a greater mass ratio of a multi-functional polymerizable compound in a total mass of the polymerizable compound than that of the ink composition.

5. The decorative sheet according to claim 1, wherein the image running prevention region has a higher glass transition temperature (Tg) than the image layer.

6. The decorative sheet according to claim 2, wherein the image running prevention region has a higher glass transition temperature (Tg) than the image layer.

7. The decorative sheet according to claim 3, wherein the image running prevention region has a higher glass transition temperature (Tg) than the image layer.

8. The decorative sheet according to claim 1, wherein a reflective layer is provided between the image layer and the image running prevention region, and the reflective layer includes a white pigment and/or a metallic powder pigment.

9. The decorative sheet according to claim 2, wherein a reflective layer is provided between the image layer and the image running prevention region, and the reflective layer includes a white pigment and/or a metallic powder pigment.

10. The decorative sheet according to claim 3, wherein a reflective layer is provided between the image layer and the image running prevention region, and the reflective layer includes a white pigment and/or a metallic powder pigment.

11. The decorative sheet according to claim 4, wherein a reflective layer is provided between the image layer and the image running prevention region, and the reflective layer includes a white pigment and/or a metallic powder pigment.

12. The decorative sheet according to claim 1, wherein the resin sheet is selected from the group consisting of polycarbonate, polyethylene terephthalate, and an acrylic resin.

13. An in-mold forming method comprising:
   a step of fixing the decorative sheet according to claim 1 to an inner wall of a hollow portion formed by a fixed mold and a moving mold arranged to face each other; and
   a step of injection forming in which a gate position is arranged at a position facing an image running prevention region so as to cause a molten resin poured into the hollow portion from the gate to come into contact with the image running prevention region.

14. The in-mold forming method according to claim 13, wherein the step of fixing of the decorative sheet is a step of fixing of the decorative sheet formed by vacuum forming or pressure forming.

* * * * *